Nov. 25, 1969  R. L. HOLLOWAY  3,480,131
BUCKET CONVEYER
Filed Nov. 28, 1967  2 Sheets-Sheet 2
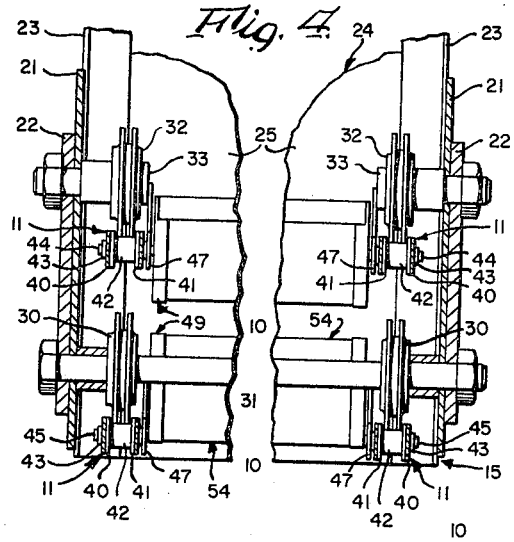
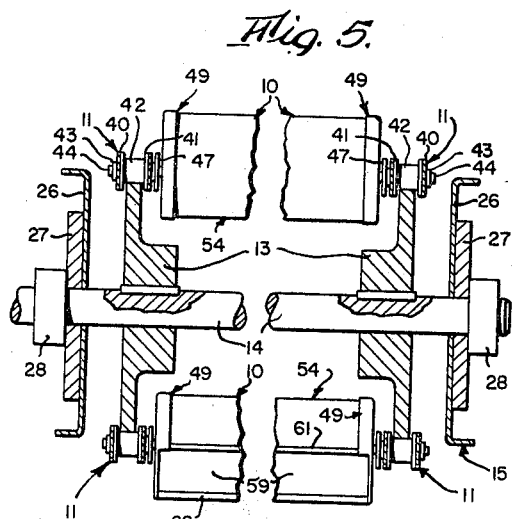
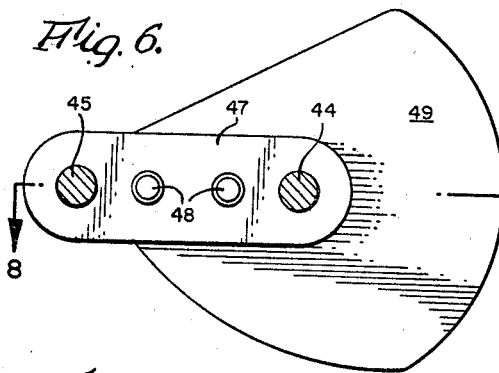
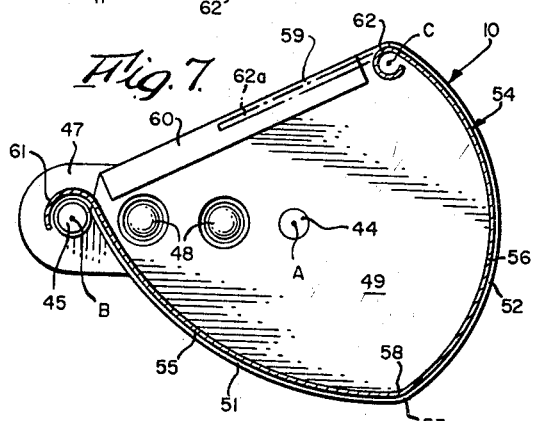
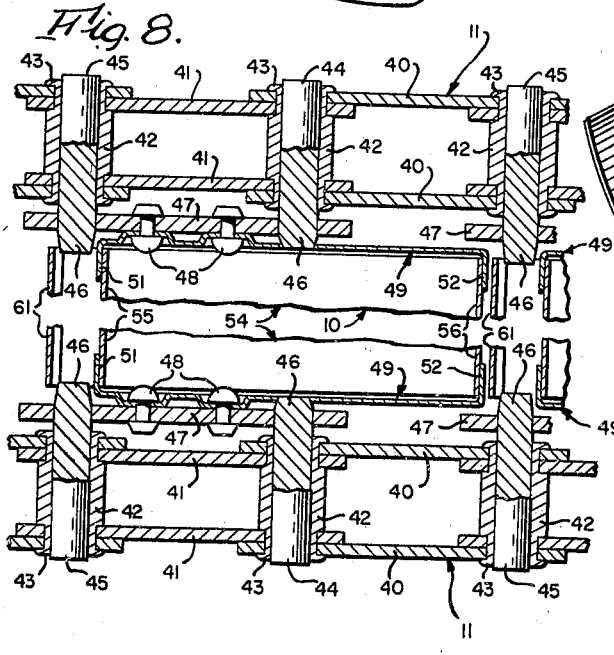
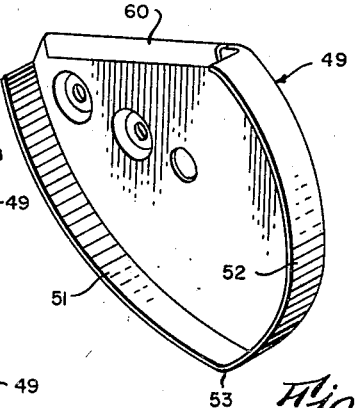
INVENTOR.
Robert L. Holloway United States Patent Office 3,480,131
Patented Nov. 25, 1969

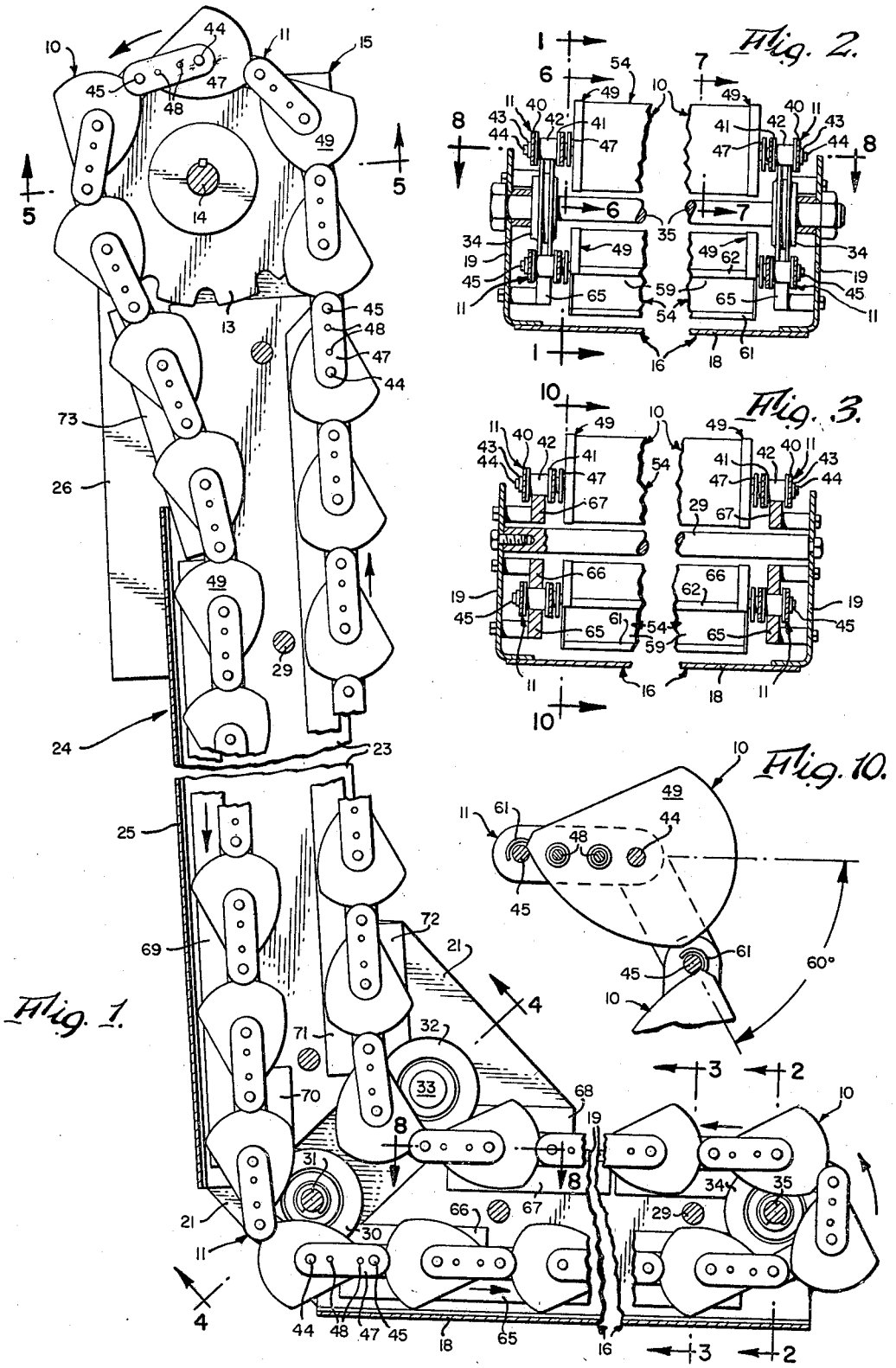

3,480,131
BUCKET CONVEYER
Robert L. Holloway, Snyder, N.Y., assignor to Chisholm-Ryder Company, Inc., Niagara Falls, N.Y., a corporation of New York
Filed Nov. 28, 1967, Ser. No. 686,186
Int. Cl. B65g 17/16
U.S. Cl. 198—151                                8 Claims

ABSTRACT OF THE DISCLOSURE

Particularly to provide an endless, high speed bucket conveyer having closely spaced parallel flights capable of sharp turns and reversals, a pair of transversely spaced standard hollow pin conveyer chains are employed. Each bucket has each end head fixed to a link having solid pins fitted and secured within pairs of adjacent hollow pins of the chains. One solid pin of each end head is on an axis through the center of the bucket and the other solid pin thereof is on an axis outboard and along one edge of the mouth of the bucket. For maximum internal bucket capacity and close bucket-to-bucket spacing at all times, each bucket has two side walls in the form of outwardly bulging cylindrical segments joined together to form the bucket bottom and, with the end heads, form the bucket mouth. One side wall of each bucket is concentric with its center axis and the other concentric with an axis adjacent the lip formed by its one side wall, the two walls being thereby heart-shaped in cross section with one lip traveling in closely and uniformly spaced relation to one side wall of the next bucket. The pitch of each chain is approximately equal to 60° of travel about the axis of the minimum size of rollers used to guide the chains around turns.

---

In the accompanying drawings, FIG. 1 is a fragmentary vertical section taken generally along line 1—1, FIG. 2, parts, particularly the solid pins 44, 45 of the chain links 47, being shown in elevation. FIGS. 2, 3, 4 and 5 are fragmentary transverse sections taken generally on the correspondingly numbered lines of FIG. 1. FIG. 6 is an enlarged end elevational view of one of the buckets showing a link of the conveyer chain riveted thereto this view being taken on line 6—6, FIG. 2. FIG. 7 is an enlarged transverse section through one of the buckets, this section being taken generally on line 7—7, FIG. 2. FIG. 8 is an enlarged fragmentary horizontal section taken generally on lines 8—8, FIGS. 1 and 2. FIG. 9 is a perspective view of one of the end heads for each bucket. FIG. 10 is a fragmentary enlarged vertical section taken generally on line 10—10, FIG. 3 and particularly illustrating that pitch of each conevyer chain is approximately equal to 60° of travel about the axis of the minimum size of roller used to guide the chains around turns.

A feature of the invention is that the endless bucket conveyer can follow a very tortuous path, through very restricted spaces, at high speed and safely receive, convey and discharge delicate products without injury thereto. Further, the conveyer can turn sharply, and sharply reverse its direction and can be driven by a pair of sprockets having very small pitch line or circle diameters. The net result is that a high speed bucket conveyer can be provided which will not only travel along and through restricted and irregularly located spaces among other mechanisms, and which can be designed to turn sharply, as may be required, to snake around such other mechanisms, but will also receive, convey and discharge delicate products without injury.

The buckets, indicated generally at 10, are carried between a pair of chains, indicated generally at 11, and which are driven by a pair of sprockets 13 fast to a drive shaft 14. This drive shaft is shown as journalled at the top of a frame 15 which can vary widely, of course, as to form, and is illustrated in a simple form as comprising a horizontal base part 16 composed of a base plate 18 and side walls 19 rising from the longitudinal side edges of the base plate 18. At one end vertical frame plates 21 project diagonally upwardly and outwardly from the side plates 19 of the base and are severally reinforced by outside bars 22 which extend diagonally in a direction perpendicularly to the said diagonal projection of the frame plates 21. The frame plates jointly support the side walls 23 of an upright leg 24, these side walls being connected, in the same manner as with the base 16, by a cross plate 25 so that the leg 24 is channel-shaped in cross section, its channel facing the space over the base 16. Each side wall 23 carries an upright channel-shaped plate 26 the vertical side flanges of which project outwardly as shown in FIG. 5 and each of which externally carries a block 27 which supports a bearing 28 for the drive shaft 14.

It will be seen that the frame 15, illustrated as a simplified example, comprises a channel-shaped riser or post 24 rising from one end of the channel-shaped base 16 and that both the riser 24 and base 16 can be strengthened by cross rods 29.

The stretches of each endless chain 11 are shown as traveling in transversely spaced, generally parallel relation to each other and as making a sharp, almost right angle, turn from the verticle to the horizontal at the knee or between the diagonal frame plates 21. For this purpose, one stretch of each chain 11 travels around on the double rim of a corresponding roller 30 (FIG. 4) suitably journalled on the corresponding side of a cross rod or bolt 31 extending through and bolted to the lower ends of the diagonal reinforcing bars 22. At this location, the other stretch of each chain 11 travels around on the double rim of a roller 32 (FIG. 4) journalled on a stud bolt 33 secured at the upper end of its diagonal reinforcing bar 22 to project coaxially inwardly from its diagonal frame plate 21.

The end of each endless chain 11 remote from its sprocket 13 travels around on the double rim of a corresponding roller 34 suitably journalled on the corresponding end of a cross rod or bolt 35 (FIG. 2) extending through and bolted to the side walls 19 of the base 16.

Each of the chains 11 is a conventional hollow pin conveyer chain having a pair of outside links 40 alternating with a pair of inside links 41 and pivotally connected thereto by hollow or tubular pins 42, the ends 43 of these hollow pins 42 being expanded, as best shown in FIG. 8, to hold the links of the chain together and in spaced relation at opposite ends of these pins.

The hollow or tubular pins 42 carry, alternately, two coaxial series of solid pins 44, 45 which project, as indicated at 46, toward the vertical center plane of the conveyer. A link 47 connects each pair of projecting ends 46 thereby to provide, in effect, additional links, these additional links corresponding to the inside chain links 41 but traveling along the opposing sides of the pair of chains 11. To each of these inboard links 47 is secured, as by a pair of rivets 48, the end head 49 of a corresponding bucket 10.

The heart of the invention resides in the shape, dimension and spacial relationship between these buckets 10 and the alternate links 40, 41 of the pair of chains 11 which carry them.

Thus each bucket comprises a pair of the end heads 49 which are heart or shield-shaped in elevation and each of which is secured at its leading side to the corresponding link 47 by the pair of rivets 48. Along its leading curving edge each end head 49 has a laterally projecting flange 51 and along its trailing curving edge each end head 49 has a laterally projecting flange 52, each pair of these flanges meeting in a shallow V-shaped point 53. The flanges 51, 52 of one end head 49 of each bucket oppose the flanges 51, 52 of the other end head thereof, and these opposing flanges have secured thereto the sheet metal body 54 of the bucket.

The leading flanges 51 of each pair of end heads support the leading wall 55 of each bucket, and the trailing flanges 52 of each pair of end heads support the trailing wall 56 of each bucket. These walls of each bucket are integral, or joined at their V-shaped bottom 58, and each wall 55, 56 is in the form of a segment of a cylinder and bulges outwardly to form the body 54 which is heart or shield-shaped in cross section, providing each bucket with a rectangular mouth 59, the end heads 49 having their edges beaded, as indicated at 60, at this mouth. Also the outer lip or edge 61 of the leading wall 55 can be of semi-circular cross section as shown, projecting outwardly concentric with the corresponding solid pins 45, and the outer lip or edge 62 of the trailing wall 56 can be of circular cross section and projecting across the mouth of the bucket. These edges 61, 62 not only strengthen the buckets and insure their proper fill with the project, but also provide a container in which the buckets are in a continuous edge-to-bucket relation at all times, including not only the straightaways, and while going around the sprockets 13 but also while going around the double rimmed rollers, not only at the knee of the frame, but also while making the sharp reverse turn illustrated at the lower right of FIG. 1 and in adjacent FIG. 10. Also the extent to which the lip 62 extends across the mouth 59 of each bucket toward the opposite lip 61 depends on the material being handled. For example, with liquids, each lip 62 could advantageously extend half way across the mouth 59, since the bucket would then retain more liquid when swung to the position shown in the upwardly moving stretch in FIG. 1. Such a modified form of lip is shown by dotted lines at 62a, FIG. 7.

Support and guide rails 65–73 supported by suitable brackets, can be placed to support and guide different stretches of the chains 11 to and from the rollers and sprockets around which the chains travel.

With the particular bucket conveyer illustrated, and with the chains driven in the direction of the arrows shown in FIG. 1, the buckets 10 are fed at the lower right, FIG. 1, while traversing the top horizontal stretch with their mouths opening upwardly, and with the bottom walls of the buckets now being the walls 55. As the buckets go up the right hand upright stretch, FIG. 1, the walls 56 become the bottom walls of the buckets. On traveling over the crest of the sprockets 13, the walls 55 again become the bottom walls and the product is discharged along the descending sides of the sprockets 13.

Of course, the direction of movement of the chains could be reversed, in which event loading would be at the right hand side of the sprockets 13 and discharge below the rollers 34.

As to the heart of the invention residing in the shape, dimension and spacial relationship between the buckets 10 and the chain links 40, 41, 47, confining our attention to one bucket and the pair of links 47 fixed thereto by the rivets 48 and the pairs of pins 44, 45 supporting these links, it will be noted that the axis A of the pins 44 extends centrally through the bucket, whereas the axis B of the pins 45 is outboard of the body 54 of the bucket and concentric with the semicircular outwardly projecting lip 61 thereof. It will also be noted that the body wall 56 is in the form of a cylindrical segment concentric with the axis A, whereas the other cylindrical segment body wall 55 is concentric with an axis C adjacent, and preferably concentric with, the lip 62 of the side wall 56. As a result, each bucket 10 has maximum capacity in rounding sharp turns, such as in the lower right, FIG. 1, since in moving from, say, the bottom most stretch, the lip 61 of each bucket travels in closely and uniformly spaced relation with the curved wall 56 of the next preceding bucket, and on moving thereafter into the top horizontal stretch, this lip 61 again travels in closely spaced relation to this curved wall 56 of the preceding bucket.

As illustrated in FIG. 10, the pitch of the chains 11 is approximately equal to 60° of travel about the axis of the minimum size rollers 30, 32 or 34 used to guide the chains around turns, such sharp turns being particularly important in adapting the conveyer to extremely cramped conditions. The sprockets 13 must be, of course, of larger pitch diameter than the rims of these minimum diameter rollers 30, 32, 34.

Obviously the buckets 10 can be made of any material in any way, such as of plastic and the like, and the conveyer will have widely different configuration depending upon the environmental conditions.

I claim:

1. A bucket conveyer having a conveyer chain (11) including a succession of links (40, 41, 47), and pins (42, 44, 45) pivotally connecting said links together in end-to-end relation, wherein the invention comprises a series of buckets (10) having end heads (49) severally fixed (48) to alternate links (47), the axis (A) of one pivot pin (44) of each such alternate link (47) extending centrally through the bucket (10) fixed thereto, and the axis (B) of the other pivot pin (45) of each such alternate link (47) being outboard of the body (54) of the bucket (10) fixed thereto.

2. A bucket conveyer as set forth in claim 1 wherein each of said buckets (10) has a pair of side walls (55, 56) projecting generally perpendicularly from each end head (49), one edge (61, 62) of each side wall (55, 56) forming, with the corresponding edge (60) of said end head (49), the rim of the mouth (59) of said bucket (10), the other edges (58) of said side walls (55, 56) being joined together and said side walls (55, 56) being in the form of outwardly bulging generally cylindrical segments to provide a bucket body (54) which is generally heart-shaped in cross section.

3. A bucket conveyer as set forth in claim 2 wherein one side wall (56) of each bucket (10) is generally concentric with the axis (A) of its said one pivot pin (44) whereby the edges (61) of the other side walls (55) of the buckets (10) swing in closely and generally uniformly spaced relation to these one side walls (56) of adjacent buckets (10) as the chain (11) rounds curves provided by rollers (30, 32, 34) and the like.

4. A bucket conveyer as set forth in claim 3 wherein said edge (61) of said other side wall (55) of each bucket (10) is in the form of a lateral rounding outward extension from said other side wall (55) and is generally concentric with the said axis (B) of said other pivot pin (45) of each bucket (10).

5. A bucket conveyer as set forth in claim 3 wherein said other side wall (55) of each bucket (10) is generally concentric with an axis (C) adjacent the edge (62) of its said one side wall (56) whereby the corresponding edge (61) of the next bucket travels in closely and generally uniformly spaced relation to said one side wall (56) as said chain (11) rounds curves provided by rollers (30, 32, 34) and the like.

6. A bucket conveyer as set forth in claim 5 wherein said edge (62) of said one side wall (56) extends across the mouth (59) of said bucket to reduce the size of said mouth (59).

7. A bucket conveyer as set forth in claim 1 wherein the pitch of said chain (11) is approximately equal to 60° of travel about the axis of the minimum size of rollers (30, 32, 34) used to guide the chain (11) around turns.

8. A bucket conveyer as set forth in claim 1 wherein the conveyer chain (11) is a conventional hollow pin (42) conveyer chain and wherein each of said alternate links (47) is provided at its opposite ends with laterally projecting pins (44, 45) projecting into pairs of adjacent hollow pins (42).

References Cited

UNITED STATES PATENTS 342,732   5/1886   Cole _____ 198—140

EVON C. BLUNK, Primary Examiner

D. D. WATTS, Assistant Examiner

U.S. Cl. X.R.

198—152